United States Patent [19]

Marhauer

[11] 4,306,770
[45] Dec. 22, 1981

[54] SIDE MIRROR FOR VEHICLES

[76] Inventor: Friedrich Marhauer, Buchholzer Strasse 49, 3000 Hannover 61, Fed. Rep. of Germany

[21] Appl. No.: 96,162

[22] Filed: Nov. 20, 1979

[30] Foreign Application Priority Data

Nov. 20, 1978 [DE] Fed. Rep. of Germany ....... 2850327

[51] Int. Cl.³ .......................... G02B 5/10; G02B 7/18
[52] U.S. Cl. ................................... 350/303; 350/293; 248/467
[58] Field of Search ............... 350/303, 304, 293, 299; 248/467

[56] References Cited

U.S. PATENT DOCUMENTS 3,151,207  9/1964  Moller .................................. 350/303

FOREIGN PATENT DOCUMENTS 2255268  5/1974  Fed. Rep. of Germany .

Primary Examiner—Jon W. Henry
Attorney, Agent, or Firm—Manfred M. Warren; Robert B. Chickering; Glen R. Grunewald

[57] ABSTRACT

A side mirror for vehicles, with two mirrors arranged at a given angle to each other, of which the first, larger mirror is the normal side mirror and the second, smaller, additional mirror is intended to encompass the blind spot.

9 Claims, 5 Drawing Figures

SIDE MIRROR FOR VEHICLES

BACKGROUND OF THE INVENTION

It is well known that ordinary side mirrors have the disadvantage that it is not possible to encompass the so-called blind spot with them. A passing vehicle which is located in the blind spot cannot be seen in an ordinary side mirror. This can lead to dangerous situations in street traffic if a driver, not having perceived the vehicle located in his blind spot by means of a glance at his side mirror, pulls out to pass another vehicle. On account of the invisible blind spot, dangerous situations can also arise when traffic merges on freeways and highways as well as when a vehicle leaves a parking place.

Therefore, it has become familiar to provide a separate additional mirror for the blind spot and to mount it on the mirror surface of the normal side mirror. Such a side mirror shows, accordingly, two mirrors running at an angle to each other, of which the first mirror comprises the normal side mirror and the second mirror is intended to encompass the blind spot.

As opposed to the traditional side mirrors, such so-called angle mirrors permit the attainment of greater safety in street traffic. However, it has been shown that the angle mirrors are not free from disadvantages either, and for the following reasons. Mounting the additional mirror to the mirror surface of the normal side mirror reduces its effective size, and as a result the field of vision encompassed by the normal side mirror for the driver is reduced as well. In addition, it is a disadvantage that the mirror surface of the additional mirror must be located at an angle to the mirror surface of the normal mirror. This causes the appearance of a break at the point where the mirror surface of the normal side mirror ends and the mirror surface of the additional mirror begins, leading to a visual gap between the fields of vision of the additional mirror and the normal one. This visual gap, which is not to be avoided with the familiar angle mirrors, can be so large that, e.g., a motorcycle passing the vehicle "disappears," and the driver looking into his side mirror cannot perceive this motorcycle. Finally, the entire mirror image appears to the driver of the vehicle equipped with an angle mirror as an interrupted whole, on account of the visual gap, which is irritating and requires a rather long time for the driver to get used to such angle mirrors.

SUMMARY OF THE INVENTION

This invention has the object of creating a side mirror which provides the desired additional field of vision for the blind spot without showing the disadvantageous visual gaps.

This object is attained, in one embodiment, by dividing the second mirror into at least two convex partial mirrors with a vertical dividing line, which mirrors are located at an angle to each other with the dividing line at the point of the angle, and by choosing the radius of curvature of the convex partial mirrors and the angle between them so that the field of vision encompassed by the individual mirrors taken together is free of gaps.

By means of the novel design of the second mirror as a convex mirror as well as the division of it into at least two partial mirrors, visual gaps can be avoided in a simple manner. The first mirror, bordering on the normal side mirror, fulfills essentially the function of closing the visual gap which would arise at the point of transition from the normal side mirror to the additional mirror if the additional second mirror were not convex. The first convex partial mirror, therefore, restores the field of vision which would be lost, in effect, because of the reduction in size of the mirror surface of the normal side mirror through the presence of the second mirror. However, the field of vision of the first convex partial mirror also encompasses a portion of the blind spot. A further part of the blind spot is covered by the second convex partial mirror, which borders on the outside of the first partial mirror. Of course, the two partial mirrors of the second mirror are divided from one another by a vertical wedge-shaped gap, because of their location at an angle to each other, but this does not lead to a visual gap between the two related fields of vision, because of the convex design of the two partial mirrors.

It has been shown that only the convex design of the second mirror and its division into at least two partial mirrors permits attainment of a satisfactory entire field of vision which is free of visual gaps.

It has, of course, become familiar through the periodical *ADAC-Motorwelt* (1978, Volume 7, p. 15, righthand column, third mirror from the top) to equip the side mirror with a one-piece convex mirror surface in order to avoid visual gaps in this way; however, there is the disadvantage that the mirror surface is not uniformly convex, and therefore there are areas in which different radii of curvature are present. This leads to undesirable distortions of the mirror image. There is the further disadvantage that the driver looking into the mirror is easily deceived with regard to the closeness of a vehicle appearing in the mirror, because the mirror surface area for the "normal" field of vision is not flat, but rather convex. Finally, this familiar side mirror is relatively expensive, since the mirror surface is not uniformly convex but, rather, to differing degrees. These disadvantages do not appear in the case of the invention, and it suffices to make only the second mirror convex and to divide it into at least two partial mirrors, so that the mirror according to the invention is also cheaper than the familiar one-piece side mirror.

A further advantage provided by the invention lies in the fact that the two partial mirrors preferably will show the same radius of curvature. The second additional mirror can, therefore, be manufactured initially as a single piece, which is then divided into two partial mirrors by means of a cutting device. It has proven to be particularly advantageous to divide the two in such a way that the first partial mirror makes up about ⅓ and the second partial mirror about ⅔ of the entire mirror surface of the second mirror.

As an advantageous extension of the invention, it is intended to locate the second mirror on the outer side of the side mirror, away from the vehicle, adjacent to the outer edge of the side mirror mount. The second mirror with its partial mirrors can be attached in an essentially familiar way as an additional mirror unit to a wedge-shaped base, which is mounted to the first mirror surface and is provided with mounting surfaces for the partial mirrors which meet at an angle. On the other hand, the invention also makes it possible to avoid special mounting of the second mirror, if the first and the second mirrors are firmly attached as an integrated unit to the common side mirror mount.

An extension of the invention has been found to be advantageous, in which the overlapping of the individual fields of vision of the partial mirrors and the normal side mirror amounts to about 10 to 20 cm. at a distance to the rear of 10 m.

DETAILED DESCRIPTION OF THE INVENTION

In the following, the invention is explained in more detail with reference to the drawings.

Figure 1:
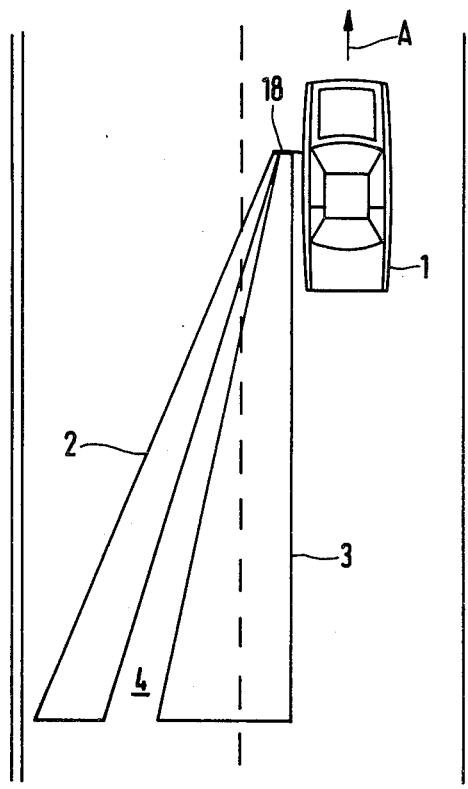
FIG. 1 shows the division of the fields of vision of the side mirrors of the prior art.

In order better to understand the invention, the division of fields of vision of side mirrors of the prior art will be clarified with reference to FIG. 1. The prior art side mirror 18, attached to a vehicle 1 driving in the direction indicated by the arrow A, offers the driver two fields of vision 2 and 3, which are divided by a visual gap 4. The field of vision 3 of the mirror surface of the normal side mirror is restricted because of the reduction in its size through the attachment of the familiar additional mirror. Since, as is well known, the additional mirror runs at an angle to the surface of the normal side mirror, the visual gap 4 arises, which can be so great that smaller vehicles, e.g., a motorcycle, are under some circumstances no longer visible.

Figure 3:
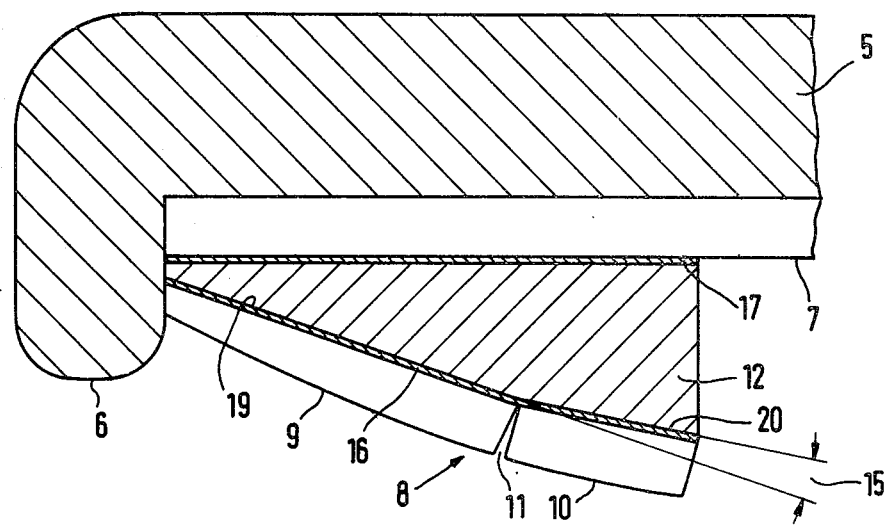
FIGS. 3 and 4 show a cross-sectional view of two different examples of a side mirror according to the invention.
Figure 2:
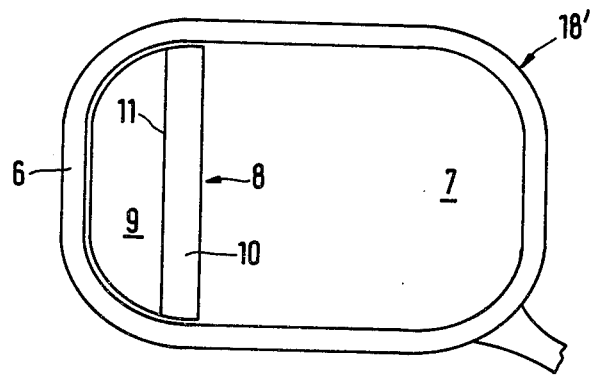
FIG. 2 shows a side view of a mirror according to the invention.
Figure 4:
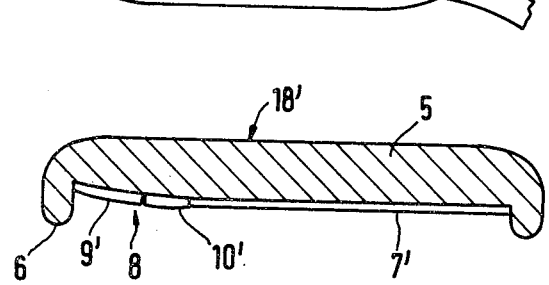

This disadvantage is avoided by the side mirror according to the invention, two examples of which are shown in FIGS. 2-4. According to an initial example, the second mirror 8 is convex and divided into two convex partial mirrors 9 and 10. The convex design of the two partial mirrors 9 and 10 can be such that their domed surfaces have the shape of a section at the surface of a sphere or a cylinder, in which latter case the axis of the imagined cylinder runs perpendicular to the plane of the drawing in FIG. 3. In order to avoid as far as possible the distortions of the mirror image caused by the convex design, the radius of curvature is chosen to be relatively large. A value of r = 1400 mm, for example, has proven to be advantageous. The second mirror 8 is mounted on a wedge-shaped base 12, which is adhesively mounted in an essentially familiar way, by the aid of a piece of two-sided tape 17, on the outside of the mirror surface of the first mirror 7, adjacent to the outer edge 6 of the side mirror mount 5, which supports the first mirror 7.

The two partial mirrors 9 and 10 meet at an angle identified with the number 15. For that reason the wedge-shaped base 12 is provided with two mounting surfaces 19 and 20 which meet at the angle 15, to which surfaces the two partial mirrors 9 and 10 are secured by means of a piece of two-sided tape 16.

The division of the second mirror 8 into the two partial mirrors 9 and 10 can be accomplished by attaching two-sided tape 16 to the still undivided convex mirror and separating it into two parts by means of a cutting device, the two parts being held together by means of the tape 16. Thus the two partial mirrors have the same radius of curvature. Then when the tape 16 is pressed onto the mounting surfaces 19 and 20, which meet at an angle, a very small wedge-shaped gap 11 appears between the two partial mirrors. This gap does not, however, lead to a visual gap, because the partial mirrors 9 and 10 are convex. It is, of course, also conceivable to manufacture the two partial mirrors 9 and 10 separately and with differing radii of curvature and also to mount them separately to the mounting surfaces 19 and 20.

In contrast to FIG. 3, the above-mentioned wedge-shaped base 12 is not provided in FIG. 4. In this example, the entire side mirror 18' is attached as an integrated unit to the common side mirror mount 5. The division of the two convex partial mirrors 9 and 10 or 9' and 10', as the case may be, is preferably chosen so that the one area 9 or 9' makes up about ⅔ and the other area 10 or 10' about ⅓ of the entire surface of the second mirror 8. In this regard the smaller partial mirror 10 or 10' is that partial mirror which borders on the mirror surface of the first mirror 7 or 7'.

Figure 5:
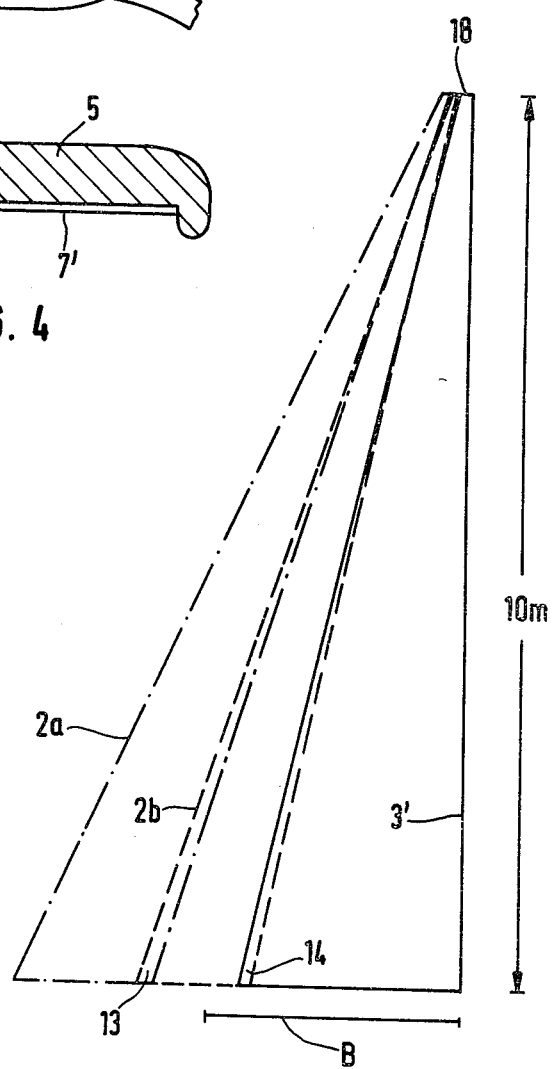
FIG. 5 shows the fields of vision in the case of a side mirror according to the invention.

The fields of vision of the various mirror surfaces provided by the side mirror 18' according to the invention, as in FIG. 3, are illustrated in FIG. 5. For the sake of clarity, the field of vision 2a of the outer convex partial mirror 9 is shown with a broken and dotted line, the field of vision of 2b of the other partial mirror 10 with a simple broken line, and the field of vision 3' of the mirror 7 of the normal side mirror with a solid line. The distance indicated by B marks the width of the field of vision of the normal side mirror, which is present before the mounting of the wedge-shaped base 12 to the mirror 7. It can be seen that the presence of the second mirror 8 does reduce the original field of vision of the side mirror to the field of vision 3'; however, this does not lead to a visual gap. As the field of vision 2b indicates, this loss is made up by the convex partial mirror 10 of the second mirror. In addition, the field of vision 2b also covers a portion of the blind spot, which is further encompassed by the field of vision 2a of the convex partial mirror 9.

The radius of curvature of the two partial mirrors 9 and 10 is so chosen that slight overlaps 13 and 14 arise. At the distance to the rear of about 10 meters on which the illustration in FIG. 5 is based, these overlaps can amount to about 10 to 20 cm. These overlaps, leading as they do to double images, could be still further reduced, but it has been shown that the given value is advantageous. It must be considered that the fields of vision as in FIG. 5 are, of course, valid only for one particular distance between the driver's eye and the side mirror. Differing distances between the driver and the side mirror, resulting from differing adjustments of the driver's seat, produce different images. The above-mentioned overlaps of about 10 to 20 cm provide a favorable compromise, so that visual gaps can be avoided even with the driver's seat in different positions.

What is claimed is:

1. A side mirror for a vehicle comprising two mirrors arranged at an angle to each other, the first of said mirrors being a flat mirror and the second of said mirrors being smaller than the first and being divided into at least convex partial mirrors with a vertical dividing line between them, said partial mirrors having a radius of curvature and being at an angle to each other with the dividing line at the point of the angle, such that the field of vision encompassed by the first mirror and the second mirror is free of visual gaps.

2. The side mirror of claim 1, wherein said partial segments of said second mirror have the same radius of curvature.

3. The side mirror of claim 1, wherein said second mirror is about one-third of said mirror surface.

4. The side mirror of claim 1, wherein said partial mirrors are of different widths.

5. The side mirror of claim 1, wherein the second mirror is located on the outer side of the side mirror away from the vehicle and adjacent to the outer edge of the side mirror mount.

6. The side mirror of claim 1, wherein the second mirror is a unit with a wedge-shaped base having mounting surfaces at an angle to each other to which the partial mirrors are mounted on the surface of the first mirror.

7. The side mirror of claim 1, wherein the first and second mirrors are attached as an integrated unit to the side mirror mount.

8. The side mirror of claim 1, wherein the first and the second mirrors are attached as a unit to a common base plate, which is adhesively mounted to the mirror surface of an ordinary side mirror.

9. The side mirror of claim 1, wherein the individual fields of vision at a distance to the rear of said mirror of 10 meters have overlapping fields of view of about 10 to 20 centimeters.

\* \* \* \* \*